UNITED STATES PATENT OFFICE 2,078,652

PROCESS FOR BREAKING PETROLEUM EMULSIONS

Melvin De Groote, St. Louis, and Bernhard Keiser, Webster Groves, Mo., assignors to Tretolite Company, Webster Groves, Mo., a corporation of Missouri No Drawing. Application June 6, 1936, Serial No. 83,958

8 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of our invention is to provide a novel, inexpensive and efficient process for separating emulsions of the kind referred to into their component parts of oil and water or brine.

Briefly stated, our process consists in subjecting a petroleum emulsion to the action of a treating agent comprising an ester derived by reaction between a polybasic carboxy acid and an amide or substituted amide, in which the acyl group is derived from a hydroxy fatty acid.

The expression "hydroxy fatty acid" is intended to include the ether anhydride derivative of dihydroxy acids or the like, insofar that such particular oxy acids act substantially the same as if they were dihydroxy acids. For instance, a dihydroxy acid in which the hydroxyl groups unite to eliminate water with the formation of an oxide of the ether type, are frequently also referred to as oxy acids, and are intended to be included within the expression "hydroxy fatty acids" or "oxy fatty acid" in the same manner that one might include phthalic anhydride within the classification of aromatic dicarboxy acids, insofar that it acts in a similar manner.

Amides may be limited to compounds in which one hydrogen of ammonia or of a corresponding primary or secondary amine has been replaced by an acyl radical from a carboxy acid. The method of preparing such compounds is well known (see Organic Chemistry, Lucas, 1935, pp. 294 and 295). Amides derived from various fatty acids, such as stearamide, oleoamide, ricinoleo-amide, etc., are available commercially in the open market. Other corresponding amides derived from hydroxy fatty acids, such as hydroxy stearamide, dihydroxy stearamide, etc., can be prepared in the same manner as is employed to prepare the commercially available fatty acid amides.

Mono-substituted or di-substituted amides of such hydroxy acids obtained by reaction with aniline, benzylamine, butyl amine, amylamine, hexyl amine, diamylamine, cyclohexanolamine, toluidine, methyl aniline, diphenyl amine, etc., may be prepared in the same manner as is employed in the manufacture of commercially available fatty acid amides. The word "amide" is intended to include the substituted as well as the unsubstituted type.

The amide of poly-ricinoleic acid can be prepared in the manner described in German Patent 552,251, to Deutsche Hydrierwerke, A. G., Rodleben, issued on June 10, 1932. This particular material will hereinafter be referred to as poly-ricinoleo-amide.

U. S. Patent 2,034,941, to De Groote, Keiser, and Wirtel, dated March 24, 1936, describes a demulsifying agent obtained by oxidation of ricinoleic acid. We have found that if such oxidized ricinoleic acid is converted into an amide, the reagent so obtained is an especially effective demulsifying agent, and it is the one which we prefer to employ. The production of such oxidized ricinoleic acid is described in detail on page 3 of said De Groote et al. patent.

We have found it most satisfactory to convert such oxy-ricinoleic acid obtained according to the procedure described in said aforementioned De Groote et al. patent, into the ethyl ester by reaction with ethyl alcohol, in presence of dry hydrochloric acid gas. We have found that the ammonolysis of such an ester yields the oxy ricinoleo-amide with considerable ease. This particular material will be referred to as oxy-ricinoleo-amide.

Other similar hydroxy or oxy fatty acid amides may be obtained by converting various other hydroxy or oxy fatty acids into amides or substituted amides in a similar manner. For instance, cottonseed oil fatty acids, corn oil fatty acids, rapeseed oil fatty acids, and the like, can be oxidized by conventional processes to yield fatty acids which can then be converted into amides by reaction with ammonia or with primary or secondary amines.

Another suitable procedure is to oxidize various unsaturated oils and convert the glycerides or esters into fatty acids by means of any suitable hydrolytic process, such as the well-known Twitchell process.

The blowing (oxidation) of various oils is a well-known commercial process and consists in selecting a suitable relatively highly unsaturated oil or acid, or a mixture of the same, and blowing said fatty material with dry or moist air, or with any other suitable oxidizing agent. This results in the production of a hydroxylated or oxy material, which may or may not also be unsaturated.

Other suitable hydroxy or oxy fatty acids which may be converted into amides or into substituted amides, include oxy-hendecenoic acid, described in U. S. Patent 2,023,996, dated December 10, 1935, to De Groote and Keiser; oxy-octadecadiene acid, described in U. S. Patent 2,023,997, dated December 10, 1935, to De Groote and Keiser; oxy-polyketo fatty acids, described in U. S. Patent 2,025,804, dated December 31, 1935, to De Groote and Keiser; oxy-keto fatty acids, such as keto hydroxy stearic acid, described in U. S. Patent 2,025,805, dated December 31, 1935, to De Groote and Keiser.

It is to be noted that the amides are, including the mono- and di-substituted amides of the type just described, characterized by the fact that there is always present at least one alcoholiform hydroxyl or its equivalent. It is well known that polybasic carboxy acids react readily with alcoholic bodies, such as monohydric alcohols, dihydric alcohols, trihydric alcohols and hydroxy fatty bodies, such as ricinoleic acid, triricinolein, etc., to produce various esters, including acid esters, in which there is a residual carboxyl. Such reactions take place readily on heating above the boiling point of water, and especially if a dry inert gas, such as carbon dioxide, is passed through the mixture to remove water which is formed during esterification. In some instances, as for example, in the production of phthalic acid esters, the anhydride can be used most advantageously in esterification. We have found that these conventional polybasic carboxy acid esterification processes, when applied to hydroxylated fatty acid amides, yield an ester which, as far as we know, is a new composition of matter, and which is very effective in breaking various oil field emulsions.

Although we prefer to use phthalic anhydride as the most desirable source of the polybasic carboxy acid, one may use other polybasic carboxy acids or their anhydrides, such as succinic, malic, fumaric, citric, maleic, adipic, tartaric, glutaric, diphenic, naphthalic, oxalic, pimelic, suberic, azelaic, sebacic, etc. Naturally a simple derivative of a polybasic acid, such as chlorophthalic acid, can be used as advantageously as phthalic acid itself, although there is no added advantage in the use of the more costly chemical compounds.

It is our preference to use the specified esters of fatty acid amides derived from castor oil as the parent material, and in many instances, ricinoleo-amide available in the open market is a very satisfactory raw material. However, in other instances, polyricinoleo-amide and oxy ricinoleo-amide, previously described, are even more satisfactory, insofar that the resulting esters appear to be more valuable as demulsifying agents. The amides of oxy-hendecenoic acid, oxy-octadecadiene acid, oxy-polyketo fatty acid, and oxy-keto fatty acids, previously referred to are desirable raw materials for esterification.

As a specific example of our preferred reagent, we react 250 pounds of phthalic anhydride with 500 pounds of ricinoleo-amide at a temperature of approximately 120 to 145° C. for approximately six to twelve hours. The reaction can be followed roughly by withdrawing a small sample of the partially reacted mass and noting its solubility in chloroform. Phthalic anhydride is insoluble in chloroform, and upon completion of the reaction, complete solubility in chloroform is obtained. We have found oxalic acid and maleic acid to be two very valuable polybasic carboxy acids for employment in the manufacture of esters of the kind contemplated as demulsifying agents in the present process. These esters are nothing more or less than amides of fatty acids in which a hydroxyl of a fatty acid acyl radical has been replaced by a polybasic carboxy acid residue.

It is to be noted that in the procedure just described, one molecule of phthalic anhydride is reacted with one molecule of ricinoleo-amide. In the resultant ester, there is a free carboxyl radical. Such acidic esters are frequently referred to as acid esters. Naturally if two molecules of ricinoleo-amide are reacted with one molecule of phthalic anhydride, a neutral ester is obtained. Similarly, if an acid ester is prepared from ricinoleo-amide and phthalic acid in the manner above described, then this acid ester can be reacted with a polyhydric alcohol such as ethylene glycol or glycerol, to give an ester in which there are free residual hydroxyl groups. Such esters are sometimes referred to as basic esters. Similarly, the acid ester derived from ricinoleo-amide and phthalic anhydride can be reacted with a monohydric alcohol such as methyl alcohol, ethyl alcohol, propyl alcohol, butyl alcohol, etc., to yield a neutral ester. In such instances where a polyhydroxylated fatty acid ester is employed, one could, of course, combine two molecules of phthalic acid, for example, so as to have two uncombined carboxyl groups. It is even possible, of course, to have esters of an amphoteric type, in which there is present both a hydroxyl radical and a carboxyl radical, as, for example, the ester produced by reacting one carboxyl of phthalic acid with one hydroxyl of dihydroxy stearamide.

Needless to say, the free carboxyl present in any acid ester can be replaced by a metal, as well as an organic radical. In other words, one can neutralize the free carboxyl with a suitable base, such as caustic soda, caustic potash, ammonium hydroxide, or various basic amines, such as monoamylamine, diamylamine, cyclohexylamine, benzylamine, etc. We prefer to use an alkylolamine, such as triethanolamine, in the neutralization of the free carboxylic hydrogen. For instance, the hydrophile properties of the preferred reagent previously mentioned can be greatly increased where desired by neutralization with triethanolamine.

It has been previously pointed out that the amides include substituted amides, that is, the derivatives of primary or secondary amines, as well as derivatives of ammonia. Such substituted amides are characterized by the presence of the —N grouping, or —NH grouping. The unsubstituted amide grouping derived from ammonia is characterized by the presence of the —NH₂ radical. In order to avoid confusion regarding the word "substitution", referring to a replacement of the hydroxyl of the fatty hydrocarbon chain and also referring to the replacement of one or both of the hydrogens of the NH₂ radical, it is sometimes convenient to use the expression "unsubstituted NH₂ radical" to indicate that the material referred to is a derivative of ammonia and not of a primary or secondary amine, although it is "substituted" in the sense that the hydroxyl radical of the fatty hydrocarbon chain (the acyl radical) has been replaced by a polybasic carboxy acid residue.

In brief, the word "amide" includes both the substituted amide type and the non-substituted amide type. The non-substituted type is identified by the use of the expression "unsubstituted" or by indication that the —NH₂ radical is present, or by both characterizations. Furthermore, certain materials may be conveniently described as being produced by a reaction between a polybasic carboxy acid and an unsubstituted hydroxylated fatty acid amide.

It is understood that in the previous discussion in which ricinoleo-amide and phthalic acid or phthalic anhydride have been used for purposes of illustration, the various other suitable amides and polybasic carboxy acids may also be employed.

We desire to point out that the superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practicing our process, a treating agent or demulsifying agent of the kind described above may be brought in contact with the emulsion to be treated in any of the numerous ways now employed in the treatment of petroleum emulsions of the water-in-oil type with chemical demulsifying agents, such, for example, as by introducing the treating agent into the well in which the emulsion is produced; introducing the treating agent into a conduit through which the emulsion is flowing; introducing the treating agent into a tank in which the emulsion is stored; or introducing the treating agent into a container that holds a sludge obtained from the bottom of an oil storage tank. In some instances, it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground. After treatment, the emulsion is allowed to stand in a quiescent state, usually in a settling tank, and usually at a temperature varying from atmospheric temperature to about 200° F., so as to permit the water or brine to separate from the oil, it being preferable to keep the temperature low enough to prevent the volatilization of valuable constituents of the oil. If desired, the treated emulsion may be acted upon by one or more of the various kinds of apparatus now used in the operation of breaking petroleum emulsions, such as homogenizers, hay tanks, gun barrels, filters, centrifuges, or electrical dehydrators.

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc. may be employed as diluents. Miscellaneous solvents, such as pine oil, carbon tetrachloride, sulfur dioxide extract, obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents, such as demulsifying agents of the modified fatty acid type, the petroleum sulfonate type, the alkylated sulfo-aromatic type, etc.

It is well known that conventional demulsifying agents may be used in a water-soluble form, or in an oil-soluble form, or in a form exhibiting both oil and water solubility. Sometimes they may be used in a form which exhibits relatively limited water-solubility and relatively limited oil-solubility. However, since such reagents are sometimes used in a ratio of 1 to 10,000 or 1 to 20,000 or 1 to 30,000, such an apparent insolubility in oil and water is not significant, because said reagents undoubtedly have solubility within the concentration employed. This same fact is true in regard to the material or materials employed as the demulsifying agent of our process.

Having thus described our invention, what we claim as new and desire to secure by Letters Patent is:

1. A process for breaking petroleum emulsions of the water-in-oil type which consists in subjecting the emulsion to the action of a demulsifying agent comprising a fatty acid amide in which a hydroxyl of the fatty acid acyl radical has been replaced by a polybasic carboxy acid residue.

2. A process for breaking petroleum emulsions of the water-in-oil type which consists in subjecting the emulsion to the action of a demulsifying agent comprising a fatty acid amide in which a hydroxyl of the fatty acid acyl radical has been replaced by a polybasic carboxy acid residue; the acyl radical of said amide being derived from ricinoleic acid.

3. A process for breaking petroleum emulsions of the water-in-oil type which consists in subjecting the emulsion to the action of a demulsifying agent comprising a fatty acid amide in which a hydroxyl of the fatty acid acyl radical has been replaced by a polybasic carboxy acid residue; the acyl radical of said amide being derived from ricinoleic acid, and the nitrogen group being of the unsubstituted NH₂ radical type.

4. A process for breaking petroleum emulsions of the water-in-oil type which consists in subjecting the emulsion to the action of a demulsifying agent comprising a fatty acid amide in which a hydroxyl of the fatty acid acyl radical has been replaced by an oxalic acid residue; the acyl radical of said amide being derived from ricinoleic acid and the nitrogen group being of the unsubstituted NH₂ radical type.

5. A process for breaking petroleum emulsions of the water-in-oil type which consists in subjecting the emulsion to the action of a demulsifying agent comprising a fatty acid amide in which a hydroxyl of the fatty acid acyl radical has been replaced by a maleic acid residue; the acyl radical of said amide being derived from ricinoleic acid and the nitrogen group being of the unsubstituted NH₂ radical type.

6. A process for breaking petroleum emulsions of the water-in-oil type which consists in subjecting the emulsion to the action of a demulsifying agent comprising a fatty acid amide in which a hydroxyl of the fatty acid acyl radical has been replaced by a phthalic acid residue; the acyl radical of said amide being derived from ricinoleic acid and the nitrogen group being of the unsubstituted NH₂ radical type.

7. A process for breaking petroleum emulsions of the water-in-oil type which consists in subjecting the emulsion to the action of a demulsifying agent comprising a fatty acid amide in which a hydroxyl of the fatty acid acyl radical has been replaced by a carboxyl-containing phthalic acid residue; the acyl radical of said amide being derived from ricinoleic acid and the nitrogen group being of the unsubstituted NH₂ radical type.

8. A process for breaking petroleum emulsions of the water-in-oil type which consists in subjecting the emulsion to the action of a demulsifying agent comprising a fatty acid amide in which a hydroxyl of the fatty acid acyl radical has been replaced by a carboxyl-containing phthalic acid residue; the acyl radical of said amide being derived from ricinoleic acid and the nitrogen group being of the unsubstituted NH₂ radical type; and said carboxyl acid of the phthalic acid residue being neutralized with triethanolamine.

MELVIN DE GROOTE.
BERNHARD KEISER.